(12) United States Patent
Vigesaa et al.

(10) Patent No.: US 7,647,551 B2
(45) Date of Patent: Jan. 12, 2010

(54) SYSTEM AND METHOD FOR FORMATTING A CELL IN RESPONSE TO DATA STORED IN A SEPARATE LOCATION

(75) Inventors: Eric Barber Vigesaa, Seattle, WA (US); Benjamin C. Chamberlain, Redmond, WA (US); Christopher M. Street, Redmond, WA (US); Bruce Cordell Jones, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 11/012,470

(22) Filed: Dec. 15, 2004

(65) Prior Publication Data

US 2006/0129913 A1 Jun. 15, 2006

(51) Int. Cl.
*G06F 17/24* (2006.01)
*G06F 7/00* (2006.01)
*G06F 15/16* (2006.01)

(52) U.S. Cl. .................. 715/217; 715/212; 715/220; 715/234; 707/3; 707/104.1; 709/203

(58) Field of Classification Search .............. 715/503, 715/504, 866, 200, 210, 212, 213, 215, 217, 715/219, 220, 744, 746, 967, 968, 205, 209, 715/226, 227, 229, 231, 234, 255, 267, 273, 715/700, 739, 760, 763; 707/1–4.6, 100, 707/102; 709/201, 202, 203, 217, 219
See application file for complete search history.

(56) References Cited

U.S. PATENT DOCUMENTS

| | | | | |
|---|---|---|---|---|
| 5,598,519 A | * | 1/1997 | Narayanan | 715/219 |
| 6,057,837 A | * | 5/2000 | Hatakeda et al. | 715/765 |
| 6,411,313 B1 | * | 6/2002 | Conlon et al. | 715/769 |
| 6,496,832 B2 | * | 12/2002 | Chi et al. | 707/102 |
| 6,626,959 B1 | * | 9/2003 | Moise et al. | 715/522 |
| 6,640,234 B1 | * | 10/2003 | Coffen et al. | 715/538 |
| 6,728,724 B1 | * | 4/2004 | Megiddo et al. | 707/102 |
| 7,269,786 B1 | * | 9/2007 | Malloy et al. | 715/212 |
| 2003/0009649 A1 | * | 1/2003 | Martin et al. | 712/1 |

(Continued)

FOREIGN PATENT DOCUMENTS

EP 1195694 A2 * 10/2002

(Continued)

OTHER PUBLICATIONS

Hyperion Essbase Release 6, "Spreadsheet Add-in User's Guide for Excel", Online! 2000, XP002224232 ,p. 2-49-2-91 and p. 3-9-3-57.*

(Continued)

*Primary Examiner*—Laurie Ries
*Assistant Examiner*—MaiKhanh Nguyen
(74) *Attorney, Agent, or Firm*—Merchant & Gould, P.C.

(57) ABSTRACT

A data cell included in a document supporting cell structured data is conditionally formatted according to data that is stored in a separate location from the document. A user is allowed to select from a drop-down menu of related data sets a particular data set for conditionally formatting the data cell. The data cell is formatted according to the data set and the condition without requiring that the data set be stored locally in the document.

19 Claims, 6 Drawing Sheets

U.S. PATENT DOCUMENTS

| | | | |
|---|---|---|---|
| 2003/0055843 A1* | 3/2003 | Chiu | 707/104.1 |
| 2004/0039736 A1* | 2/2004 | Kilmer et al. | 707/3 |
| 2004/0060001 A1* | 3/2004 | Coffen et al. | 715/503 |
| 2004/0064397 A1* | 4/2004 | Lynn et al. | 705/37 |
| 2004/0181507 A1* | 9/2004 | Megiddo et al. | 707/1 |
| 2005/0125377 A1* | 6/2005 | Kotler et al. | 707/1 |
| 2005/0267868 A1* | 12/2005 | Liebl et al. | 707/2 |

FOREIGN PATENT DOCUMENTS

WO  WO 00/73937  * 12/2000

OTHER PUBLICATIONS

Getting Started with OLAP@Work for Microsoft Excel, Online! 1999, XP002224233, pp. 1-25.*

M. Sheina, "OutlookSoft's Everest: A Collaborative Portal for Enterprise Budgeting", The Aberdeen Group Impact Report, Online! Aug. 5, 2000, XP002224236, pp. 1-2.*

N. Pendse, OLP Ommipresent, BYTE, Online! Feb. 1998, XP002224235, pp. 1-12.*

Ed Huai-hsin Chi et al., "A Spreadsheet Approach to Information Visualization," 1997, pp. 1-2.*

Desmarais, "Using the Microsoft Excel Pivot Table for Reliability Applications", IEEE 34th Annual Spring, Apr. 1996, pp. 79-91.*

Krishnamurthy et al., "On Query Spreadsheets", IEEE, 14th International Conference, Feb. 1998, pp. 131-141.*

Yasuda et al., "Using Spreadsheets (Excel for Windows)", Version 6, 1999, pp. 1-58.*

* cited by examiner

300

| Unit Sales | | | Year | Quarter | | |
|---|---|---|---|---|---|---|
| | | | 1997 | 1998 | | 1998 Total |
| Country | State Province | Product Family | | Q1 | Q2 | |
| Mexico | Guerrero | Drink | | 493 | 386 | 879 |
| | | Food | | 3212 | 2615 | 5827 |
| | | Non-Consumable | | 827 | 588 | 1415 |
| | Guerrero Total | | | 4532 | 3589 | 8121 |
| | Veracruz | Drink | | 656 | 505 | 1161 |
| | | Food | | 4785 | 4443 | 9228 |
| | | Non-Consumable | | 1270 | 1171 | 2441 |
| | Veracruz Total | | | 6711 | 6119 | 12830 |
| Mexico Total | | | | 11243 | 9708 | 20951 |
| USA | OR | Drink | 6106 | 1471 | 1405 | 2876 |
| | | Food | 48537 | 11900 | 11222 | 23122 |
| | | Non-Consumable | 13016 | 3081 | 2850 | 5931 |
| | OR Total | | 67659 | 16452 | 15477 | 31929 |
| | WA | Drink | 11389 | 2979 | 3304 | 6283 |
| | | Food | 89747 | 24174 | 25723 | 49897 |
| | | Non-Consumable | 23230 | 6211 | 6805 | 13016 |
| | WA Total | | 124366 | 33364 | 35832 | 69196 |
| USA Total | | | 192025 | 49816 | 51309 | 101125 |
| Grand Total | | | 192025 | 61059 | 61017 | 122076 |

SYSTEM AND METHOD FOR FORMATTING A CELL IN RESPONSE TO DATA STORED IN A SEPARATE LOCATION

BACKGROUND OF THE INVENTION

Data cells or formulaic cells, such as cells of a spreadsheet or calculator application, allow a user to build formulas or enter data in tables or charts. The data and formulas may have dependencies such as dependencies on other cells, dependencies on other formulas, dependencies on lists, dependencies on user-defined functions, etc. The use of functions and dependencies in a spreadsheet makes spreadsheets a powerful tool because a user can build complex formulas and analyze a wide range of data.

In addition, the cells may be used for generating various types of tables and charts such as a PIVOTTABLE spreadsheet report generated in the EXCEL software program produced by MICROSOFT CORPORATION of Redmond, Wash. A PIVOTTABLE is an interactive table that quickly combines and compares large amounts of data. The rows and columns may be rotated to see different summaries of the source data, and the details may be displayed for areas of interest. Such table reports are interactive, allowing for changes in the view of the data to see more details or calculate different summaries, such as counts or averages. In a PIVOTTABLE report, each column or field in the source data becomes a PIVOTTABLE field that summarizes multiple rows of information. A data field (e.g., Sum of Sales) provides the values that are summarized. After the report is created, it may be customized to focus on certain information, change the layout, and drill down to display more detailed data. Furthermore, conditional formatting may be applied to the data to provided additional information. Conditional formatting refers to changing the format of one or more data cells based on a condition. For example, conditional formatting may be applied that highlights the top ten entries in a column of data. In this example, the formatting is the highlighting, and the condition is that the data cell is a member of the top ten. A range of conditional formatting may be applied with various conditions applying to formatting a single spreadsheet or document.

SUMMARY OF THE INVENTION

The present invention generally relates to a system and method for formatting a cell of a spreadsheet based on data that is stored in a location separate from the spreadsheet. Previously, data for formatting a cell in a spreadsheet or other document composed of data cells required that the data on which the condition is based also be stored in the spreadsheet. For example, data for formatting a cell may have been stored in a different cell or cells of the spreadsheet itself. In contrast, the present invention provides functionality for formatting a cell based on data stored in a separate location, even on a separate computing device.

In accordance with one aspect of the present invention, a data cell that is included in an document supporting cell structured data may be conditionally formatted according to data that is stored in a separate location from the document. A user is allowed to select from a drop-down menu of related data sets a data set to be the basis for conditionally formatting the data cell. A formatting selection (e.g., a color scheme) may be applied that indicates a first set of data (e.g., profits) in a document while the document actually contains a different set of data (e.g., sales). In accordance with the present invention, the document is not required to contain the first set of data (e.g., profits) to represent the first set of data through formatting.

In accordance with one aspect of the present invention, a method is provided for formatting a data cell included in a document. The document is stored in a first location while a set of data is stored in a second, different location. A determination is made whether the set of data stored in the second location is related to the data cell. A list is generated in a formatting interface that includes the set of data when the set of data is related to the data cell. The data cell is formatted in accordance with the set of data when the set of data is selected from the list in the formatting interface.

In accordance with another aspect of the present invention, a computer-readable medium includes instructions for formatting a data cell included in a document. Again, the document is stored in a first location while a set of data is stored in a second, different location. Identification is made whether the set of data is related to the data cell. A list is established that includes the set of data and a formatting type selection is provided that corresponds to at least one type of formatting for the data cell. A formatting interface is generated that is configured to relate the set of data to a formatting selection according to a condition when a selection of the set of data from the list is made. Accordingly, when the data cell is formatted, the data is cell is formatted according to the set of data, the formatting type selection, and the condition.

In accordance with a further aspect of the invention, a computer readable medium includes an array of data cells that is stored in a first location. Also included are sets of data stored in a second, different location. At least one of the sets of data is related to the array of data cells. A user interface is provided that is instantiated in response to a user selection to format the array of data cells. The user interface provides a list that includes the sets of data related to the array of data cells. A user may select one of one the sets of data from the list. When the array of data cells is formatted, the array of data cells is formatted in accordance with the selected set of data.

BRIEF DESCRIPTION OF THE DRAWINGS

FIG. 3 illustrates an exemplary spreadsheet user interface that may be used in one exemplary embodiment of the present invention.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
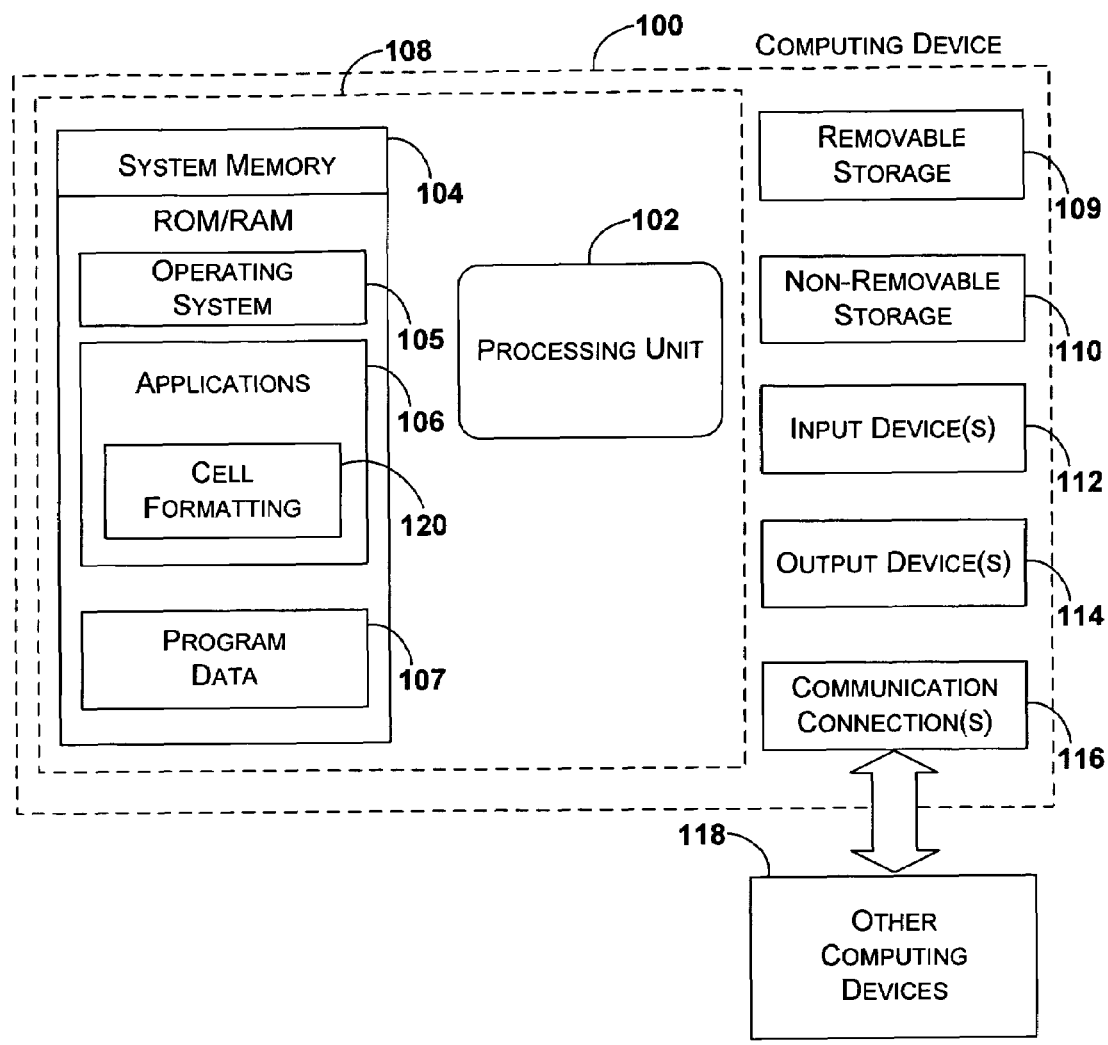
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. In one embodiment, applications 106 further include a cell formatting application 120 that, in combination with the other portions of computing device 100, provides the functionality of the present invention. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
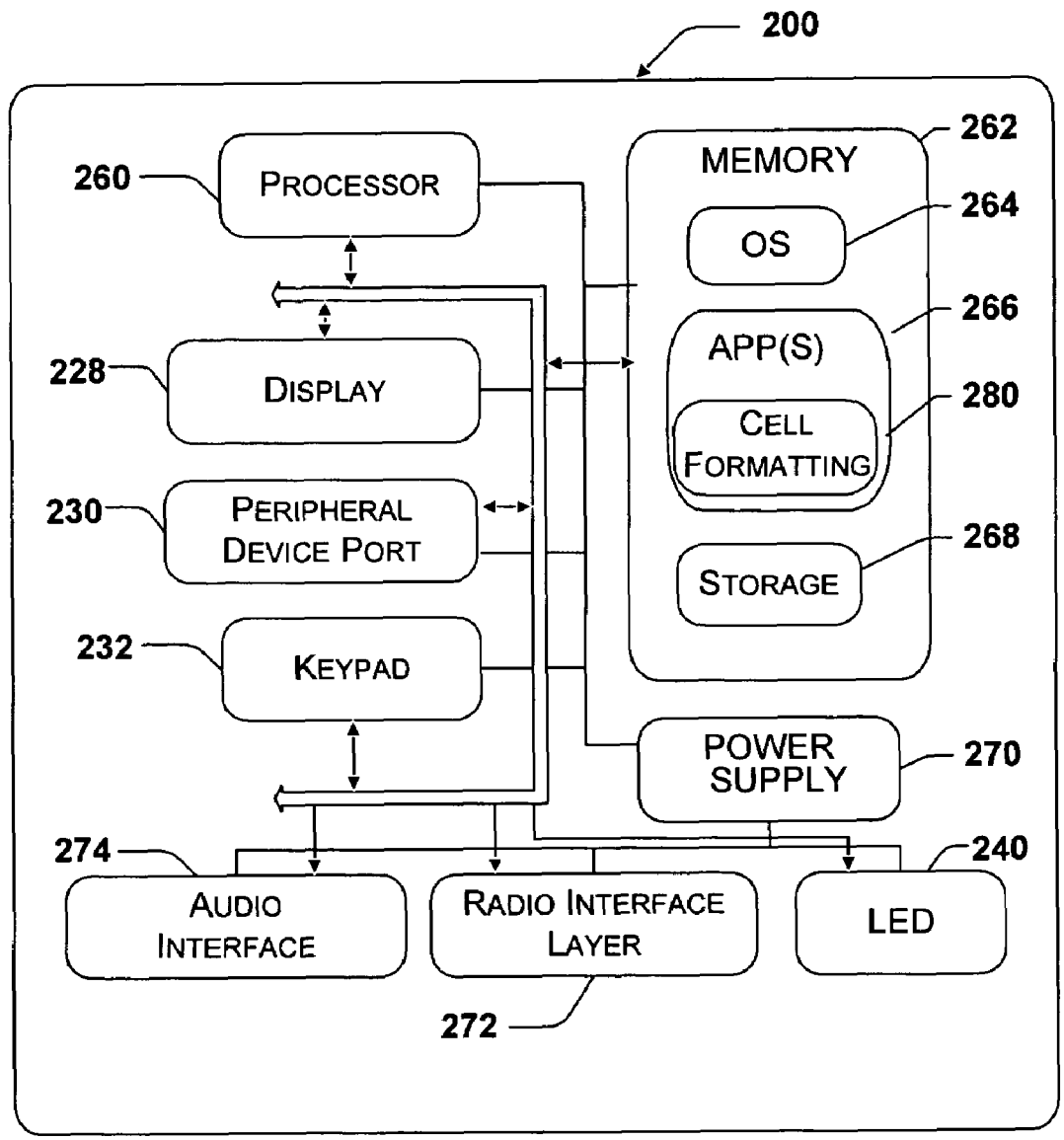
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. In one embodiment, applications 266 further include a cell formatting application that, in combination with the other portions of computing device 100, provides the functionality of the present invention.

The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Embodiments for Formatting a Cell from Data Stored in a Separate Location FIG. 3 illustrates an exemplary spreadsheet user interface that may be used in one exemplary embodiment of the present invention. The spreadsheet 300 may be any type of spreadsheet used to calculate and keep track of data. The spreadsheet 300 may include one or more data cells (e.g., 302). In one embodiment, spreadsheet 300 is a PIVOTTABLE spreadsheet report generated in the EXCEL spreadsheet software produced by MICROSOFT CORPORATION of Redmond, Wash. Data cell 302 may be configured to receive formulas, equations, numbers, letters, symbols, words, data cell dependencies or any other data forms that are conducive to a spreadsheet. Data cell 302 may be defined as a cell that is configured to allow one or more dependencies. A dependency may be defined as any type of data that includes content or formatting that is dependent on other data. Such dependencies may include a formula dependency, a spreadsheet function dependency, a defined name dependency, a list dependency, a pivot dependency, a user defined function dependency, an enumerated argument dependency, a sheet data dependency, a date object dependency, a formatting dependency, or other dependencies.

Even though the present invention is taught in conjunction with a spreadsheet 300, it is contemplated that the present invention may be implemented with any application or program utilizing or supporting data cells such as data cell 302. Spreadsheet 300 is merely taught herein for exemplary and descriptive purposes and should not be considered limiting. For example, the present invention may be used in conjunction with a calculator application where the calculator has a single data cell. Accounting applications, business applications, and banking applications that have data cells are also contemplated for the formatting functionality of the present invention.

In addition to the data included in each of the data cells (e.g., 302), some of the cells have been shaded, as shown by shaded cell 304. Shaded cell 304 corresponds to conditional formatting that is applied to spreadsheet 300 to highlight a particular cell. In the example shown, each cell corresponding to the most profitable quarter for any product family in 1998 for each state or province is shaded (e.g., shaded cell 304). Shading each of these cells adds a dimension of comparison for the results without actually including the profit data in spreadsheet 300. In accordance with the present invention, the profit data may be stored in another database or spreadsheet that is separate from spreadsheet 300. The data of the separate database is accessed to add the conditional formatting based on profit to spreadsheet 300. Accordingly, the data in spreadsheet 300 is updated to reflect the additional data that is stored in a separate location from spreadsheet 300.

In additional embodiments, the formatting of the data cells may be provided according to other types of formatting in addition to the shading shown FIG. 3. For example, a color scale may be applied to the data cells where each color indicates a separately stored value associated with each of the data cells. In addition, a data bar may provide conditional formatting to a data cell based on separately stored data, wherein the formatted cells resemble a bar chart with a graphical bar displayed in each cell. The length of each bar is related to the separately stored value. Furthermore, icons (e.g., flags) may be used in each of the data cells to represent separately stored data.

Figure 4:
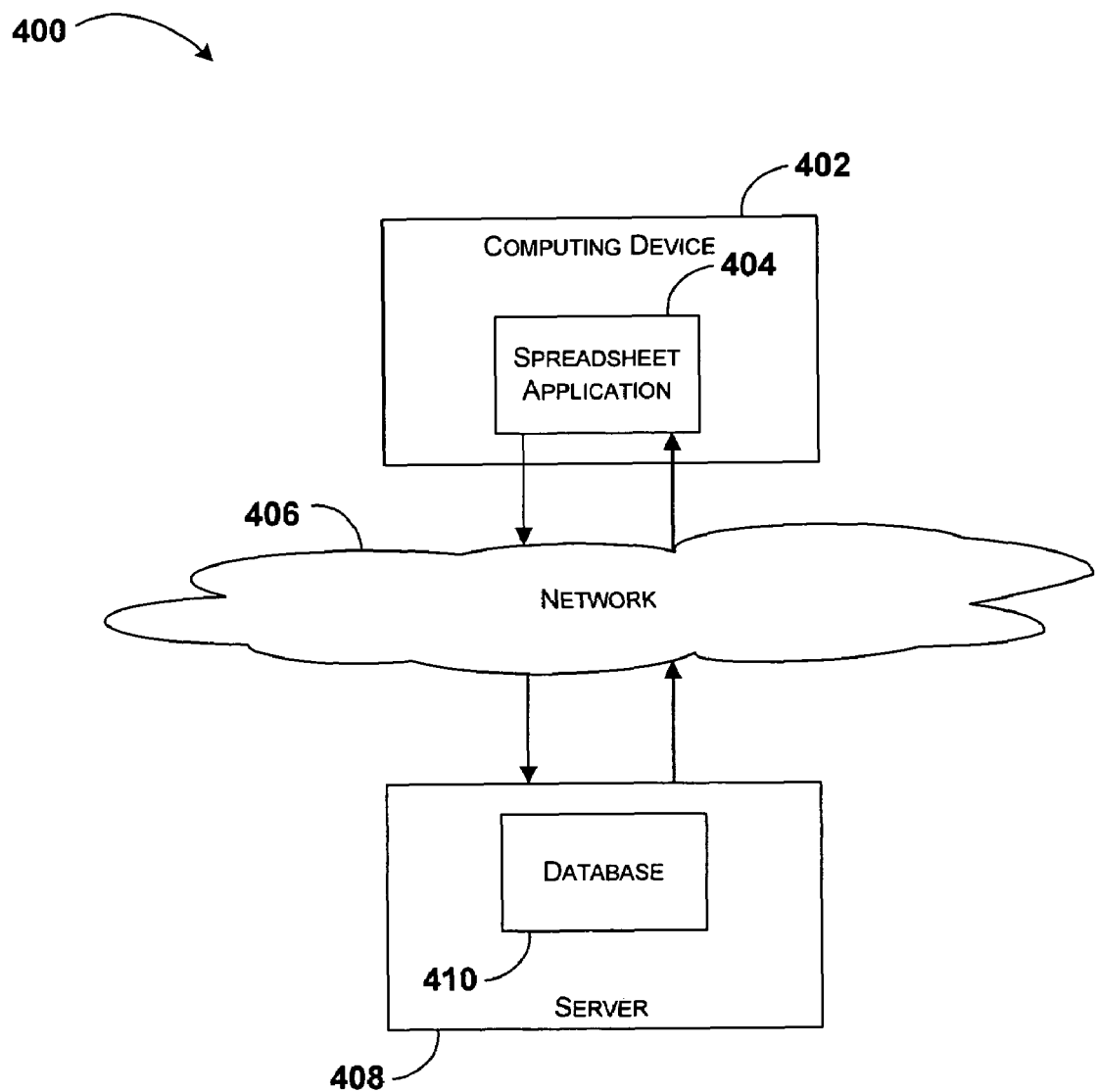
FIG. 4 illustrates an exemplary block diagram for formatting a data cell from data stored in a separate location in accordance with the present invention.

FIG. 4 illustrates an exemplary block diagram for formatting a data cell from data stored in a separate location in accordance with the present invention. Block diagram 400 includes a computing device 402, which may be similar to computing device 100 described above in conjunction with FIG. 1 or mobile device 200 described above in conjunction with FIG. 2. Computing device 402 may have a spreadsheet or other data cell application 404 that includes functionality for formatting a cell in accordance with the present invention.

In the example shown, spreadsheet application 404 communicates across network 406 to a server 408. When a user selects to format one or more data cells based on data stored separately from the spreadsheet, the data may be obtained from one of several networked locations. In one embodiment, the data for formatting a data cell is obtained from a database (e.g., 410) located on or accessible by server 408. In one embodiment, server 408 may include the WINDOWS SHAREPOINT SERVER software suite from MICROSOFT CORPORATION of Redmond, Wash. In yet another embodiment of the invention, server 408 may include an EXCEL CALCULATION SERVER program from MICROSOFT CORPORATION. In another embodiment, server 408 is an online analytical processing (OLAP) server that is arranged to which sits between a client and database 410 and understands how data is organized in the database and has special functions for analyzing the data. In still another embodiment, server 408 may be any computing devices configured to allow access to data by computing device 402 across a network.

Database 410 may be comprised of a plurality of databases. For example, database 410 may include a store for spreadsheet functions, defined names, lists, pivots, user defined functions, enumerated arguments, sheet data, date objects, and other data useful in formatting a cell. In one embodiment, the data contained within database 410 that is used for formatting the data cell is related to the data in cell. For example, the data in database 410 is profit data that corresponds to sales data within the spreadsheet being formatted. In one embodiment, the data in database 410 used for formatting and the data in the sheet being formatted are part of the same online analytical processing (OLAP) cube.

When a user is presented with a user interface (see FIG. 5) for selecting to format a cell based on data external to the spreadsheet, the spreadsheet then communicates with the storage location of the data in order to implement the formatting. Although the example shown illustrates communication over a network, other embodiments may include communication to other portions or other applications of the same computing device without departing from the spirit or scope of the present invention.

Figure 5:
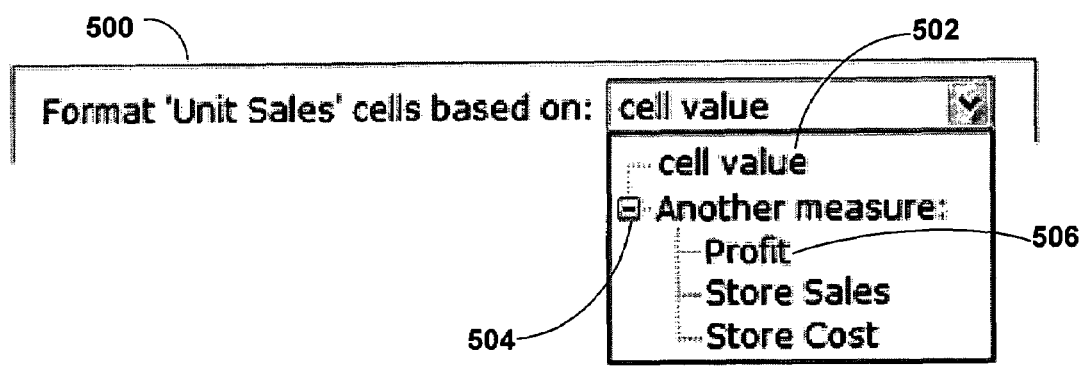
FIG. 5 illustrates a drop-down menu that includes options for formatting a data cell based on data stored in a separate location in accordance with the present invention.

FIG. 5 illustrates a drop-down menu that includes options for formatting a data cell based on data stored in a separate location in accordance with the present invention. Drop-down menu 500 is an example that illustrates a user interface allowing a user to format the 'Unit Sales' cells of a spreadsheet based on various data. For example, the cells may be formatted according to the cell value 502, but the cells may also be formatted according to another measure as indicated by selection category 504. Under selection category 504, various sets of data are populated to allow the user to select one of the data sets for formatting the cells. For example, the user may select to format the cells according to profit data 506. Profit data 506 is not included in the current spreadsheet, but is stored in another location. In one embodiment, profit data 506 is stored in a related database stored elsewhere on the computing device containing the spreadsheet. In another embodiment, profit data 506 is related to the 'Unit Sales' data in the spreadsheet according to an OLAP server (i.e., profit data 506 and 'Unit Sales' data are two measures in the same OLAP cube). Drop-down menu 500 allows for an efficient and intuitive user interface for selecting the measure by which to format the cells of the spreadsheet. Once the user selects a measure, the cells may be formatted accordingly.

Figure 6:
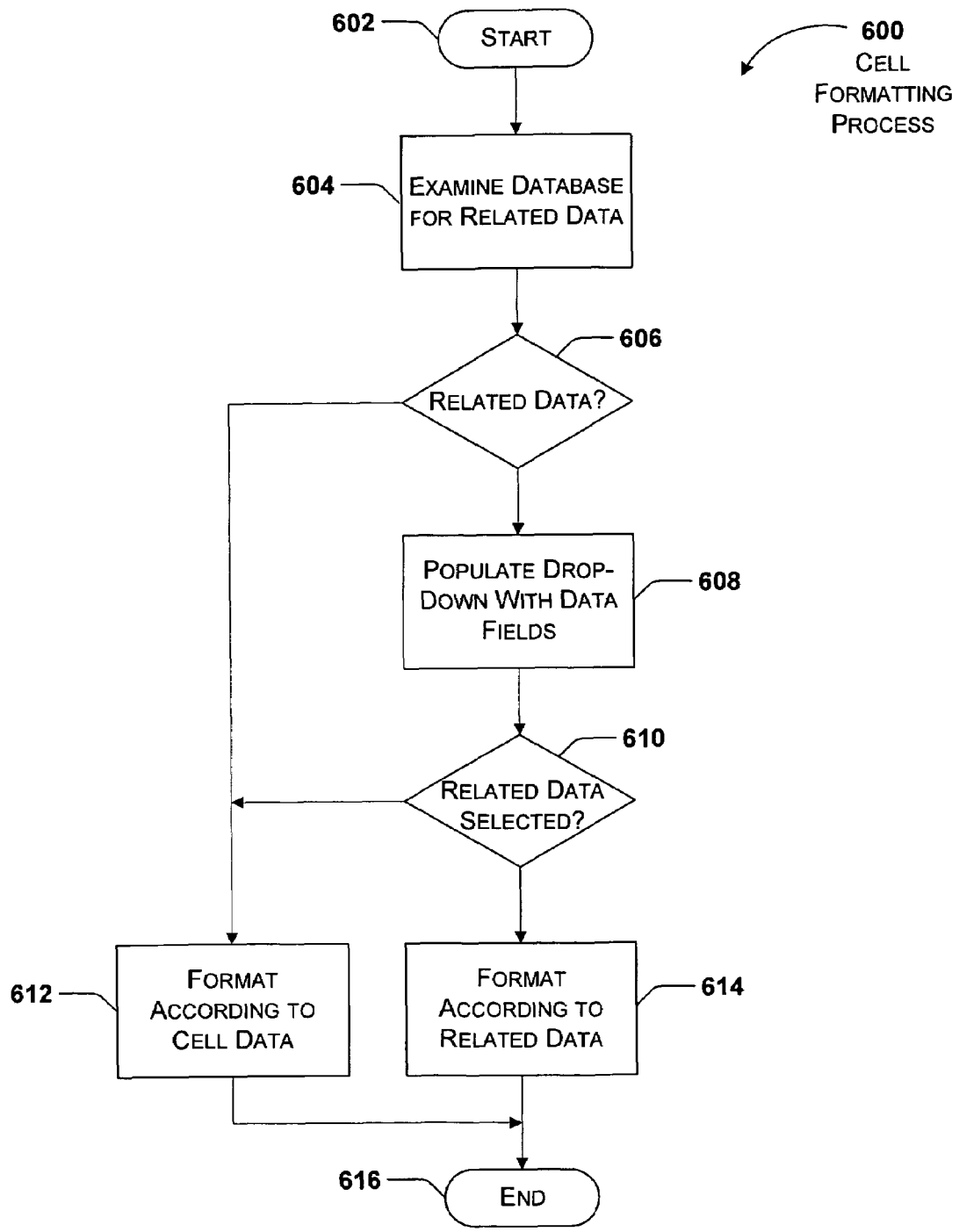
FIG. 6 illustrates a logical flow diagram for an exemplary process for formatting data cell according to data stored in a separate location in accordance with the present invention.

FIG. 6 illustrates a logical flow diagram for an exemplary process for formatting data cell according to data stored in a separate location in accordance with the present invention. Process 600 starts at block 602 where a user has generated a spreadsheet, populated the cells of the spreadsheet with data, and selected to format the cells. Processing continues at block 604.

At block 604, a database or server is accessed to determine the data available. Related data may be used to populate the drop-down menu and allow the user to select the data as a basis for formatting the spreadsheet cells. In one embodiment, the relationships between the data sets and spreadsheets are managed by an OLAP server. When two measures accessible through the OLAP server are part of the same OLAP cube, the measures are related and may be used in formatting each of the spreadsheet's data cells. In another embodiment, when the cells to be formatted are part of a PIVOTTABLE spreadsheet report, a list of the data is related to the cells may be obtained from the PIVOTTABLE spreadsheet report. Using the list, the database may be accessed for the related data. Processing continues at decision block 606.

At decision block 606, a determination is made whether data related to the current spreadsheet is among the data available in the database. If related data is not present, processing advances to block 612. However, if related data is present, processing moves to block 608.

At block 608, the drop-down menu is populated with the data fields that correspond to the data sets related to the current spreadsheet. For example, another spreadsheet stored in a separate location may keep track of profit, store sales, and store costs in separate columns on a single spreadsheet. The present invention examines the other spreadsheet and identifies the separate data sets. The present invention populates the drop-down menu based on these data sets, allowing the user to select one of the data sets as a basis for formatting the cells of the current spreadsheet. In one embodiment, a PIVOTTABLE spreadsheet report is capable of connecting to and displaying data from a variety of different data sources. These include relational databases, OLAP cubes and other spreadsheets. When a PIVOTTABLE spreadsheet report is created and connected to one of these sources, it maintains a list of data fields available from that source. Therefore, the present invention can obtain a list of related data sets for the purpose of conditional formatting by requesting the available data fields list from the PIVOTABLE spreadsheet report. Note that these data fields need not be displayed in the PivotTable. In another embodiment, the spreadsheet may access OLAP cube data with a formula, rather than through a PIVOTTABLE spreadsheet report. The OLAP cube is queried for a list of related measures (i.e. data fields) in order to populate the drop-down menu. Once the drop-down menu is populated, processing continues at decision block 610.

At decision block 610, a determination is made whether the user has selected either the related data stored in a separate location or the cell data for formatting the cells of the current spreadsheet. If the user selects the cell data of the current spreadsheet for formatting, processing moves to block 612.

At block 612, the cells of the current spreadsheet are conditionally formatted based on the current cell value and the condition selected. The formatting change is made in the manner selected by the user (e.g., icons, color scheme, data bar, etc.). Other steps in the formatting are also contemplated that would enhance the formatting of the cells such as color selection and other factors. These other steps may be added to process 600 without departing from the spirit or scope of the present invention. Once the cells are formatted based on the cell data, processing advances to block 616 where process 600 ends.

In contrast, if the user selects the related data stored in a separate location as the basis for the conditional formatting, processing moves to block 614. At block 614, the cells of the current spreadsheet are formatted based on the related data stored in a separate location and the condition selected for the formatting. The formatting change is made in the manner selected by the user (e.g., icons, color scheme, data bar, etc.). In one embodiment, an analysis process is commenced that analyses the related data, and applies the related data to the selected condition. The details of this process depend on the condition. In the case of a Boolean condition (e.g. Profit value>100), the present invention will evaluate the corresponding Profit value for each data cell value. Those profit values that are greater than 100 will be specially formatted (e.g. colored red). In the case of a range-based condition (e.g. format each cell with a data bar according to its Profit value), the present invention will determine the smallest and largest corresponding Profit values for the array of data cells. The data cell with the largest corresponding Profit value will be formatted with a maximum length data bar. Conversely, the data cell with the smallest corresponding Profit value will be formatted with the minimum length data bar. Other data cells in the array will be formatted with a data bar whose length is determined by where the corresponding Profit value lies on the scale defined by these maximum and minimum values. Other steps in the formatting are also contemplated that would enhance the formatting of the cells such as color selection and other factors. These other steps may be added to process 600 without departing from the spirit or scope of the present invention. Once the cells are formatted based on the related data stored in a separate location, processing advances to block 616 where process 600 ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for formatting a cell in response to data stored in a separate location, the method comprising:

identifying one or more data cells in a first document, wherein each of the one or more data cells is configured to present:

a value stored in association with the data cell in the first document; and a conditional format to be applied to the data cell in the first document based on an outcome of a condition, wherein the condition determining the conditional format is determined by a set of data stored in a second document, and wherein the set of data stored in the second document is not stored in the first document; wherein the second document is stored at a separate network location;

selecting the set of data stored in the second document on which the condition is based, wherein the selected set of data stored in the second document is different data from data associated with the data cell;

establishing the condition that determines the conditional format based on the outcome of the condition;

defining a formatting dependency on the data cell that defines a dependency of the data cell on a value of the set of data that is stored in the second document;

determining the outcome of the condition based on the set of data stored in the second document;

formatting the data cell in accordance with the outcome of the condition; and providing a selection of a formatting type within a formatting interface, such that a selection of the formatting type applies the formatting type to the formatting of the data cell in accordance with the outcome of the condition based on the set of data in the second document, wherein a list in the formatting interface is a menu that allows a user to select whether to format the data cell based on at least one of the set of data and data included in the data cell.

2. The computer-implemented method of claim 1, wherein the first document includes a locally-stored document stored on a client computing device and the second document is maintained on a server.

3. The computer-implemented method of claim 1, further comprising determining whether the set of data stored in the second document is related to the data cell in the first document by determining whether the data cell and the set of data are part of the same online analytical processing (OLAP) cube.

4. The computer-implemented method of claim 3, wherein determining whether the set of data stored in the second document is related to the data cell in the first document further comprises accessing an online analytical processing (OLAP) server to locate the set of data.

5. The computer-implemented method of claim 1, wherein the formatting type provides a visual indication of the outcome of the condition based on the set of data within the second document while avoiding storing the set of data within the first document.

6. The computer-implemented method of claim 1, wherein the formatting type includes at least one of a color scheme, a data bar, and an icon indicator.

7. The computer-implemented method of claim 1, wherein the formatting interface is a drop-down menu.

8. A computer-readable storage medium storing computer instructions, the computer instructions when executed by a computer performs a method for formatting a cell in response to data stored in a separate location, the method comprising:

identifying one or more data cells in a first document stored in a first location, wherein each of the one or more data cells is configured to present a value stored in the first document in association with the data cell;

providing for a conditional format to be applied to the one or more identified cells, the conditional format depending on a condition of a set of data that is stored in a second document stored in a second location that is not stored in the first location; and instantiating a formatting interface that is configured to relate the set of data to a formatting selection according to the condition of the set of data when a selection of the set of data is made, such that when the data cell is formatted, the data is cell is formatted according to the set of data, the formatting type selection, and the condition, wherein the data cell defines a formatting dependency that defines a dependency of the data cell on a value of the set of data that is stored in the second document, wherein the formatting interface provides a selection of a formatting type such that a selection of the formatting type applies the formatting type to the formatting of the data cell in accordance with the outcome of the condition based on the set of data in the second document, and wherein a list in the formatting interface is a menu that allows a user to select whether to format the data cell based on at least one of the set of data and data included in the data cell.

9. The computer-readable storage medium of claim 8, wherein the first location is a client computing device and the second location is a server.

10. The computer-readable storage medium of claim 8, wherein the formatting selection provides a visual indication of the set of data in the second document while avoiding storing the set data within the first document within the first location.

11. The computer-readable storage medium of claim 8, wherein the formatting selection includes at least one of a color scheme, a data bar, and an icon indicator.

12. The computer-readable storage medium of claim 8, wherein the condition defines the applicability of the set of data to the data cell such that the condition relates the set of data to the data cell.

13. A computer-readable storage medium storing computer-executable instructions for formatting a cell in response to data stored in a separate location, comprising:

a spreadsheet application configured to store and present data in association with a plurality of cells disposed in a spreadsheet; and a conditional formatting module configured allow the spreadsheet application to apply a selectable format to one or more selected cells in the spreadsheet based on a condition of a set of data stored in a data store separate from the spreadsheet and is not stored in the spreadsheet application, the conditional formatting interface including:

a data set selector configured to allow a user to identify selected data in the set of data on which the condition of the set of data will be determined, wherein the one or more selected cells define a formatting dependency that defines a dependency of the data cell on a value of data that is stored in the data store separate from the spreadsheet;

a condition selector configured to allow the user to specify the condition of the selected data that will trigger application of the selectable visual format to the one or more selected cells;

a format selector configured to specify a format to be applied to the one or more selected cells based on the condition of the selected data, wherein a list in the format selector is a menu that allows a user to select whether to format the data cell based on at least one of the set of data and data included in the data cell; and an analyzer configured to access and analyze the selected data and, based on the condition of the selected data, apply the format to the one or more selected cells.

14. The computer-readable storage medium of claim 13, wherein the spreadsheet includes a locally-stored file stored on a client computing device and the second document is maintained on a server.

15. The computer-readable storage medium of claim 13, wherein the data set selector is configured to allow the user to identify the selected data in the set of data from a list of available data stored in a database.

16. The computer-readable storage medium of claim 15, wherein the database includes an online analytical processing (OLAP) cube storing data relatable to the one or more selected cells in the spreadsheet.

17. The computer-readable storage medium of claim 13, wherein a formatting type applies the selectable format based on the condition of the set of data within the data store while avoiding storing the set of data within the spreadsheet.

18. The computer-readable storage medium of claim 13, wherein the formatting type includes one or more attributes associable with the one or more selected cells causing the one or more selected cells to be configured using at least one of:
   a color scheme;
   a data bar; and
   an icon indicator.

19. The computer-readable storage medium of claim 13, further comprising instructions allowing a user to select whether to format the data cell based on at least one of the set of data and data included in the data cell.

* * * * *